March 5, 1957  R. H. ABPLANALP  2,783,502
APPARATUS FOR MOLDING PLASTICS
Filed Oct. 12, 1953  3 Sheets-Sheet 1

INVENTOR.
ROBERT H. ABPLANALP
BY Cornelius Zabriskie
ATTORNEY

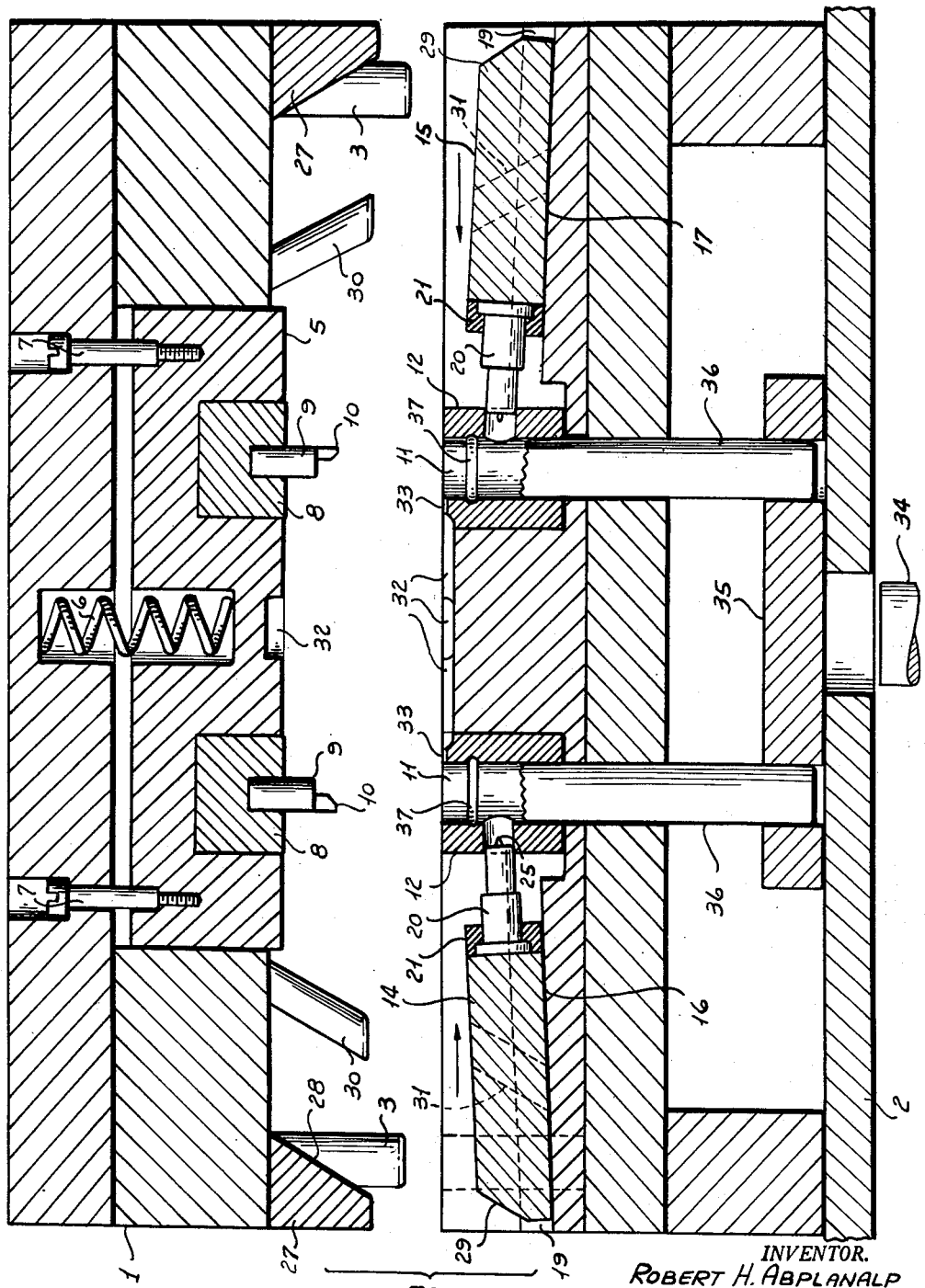

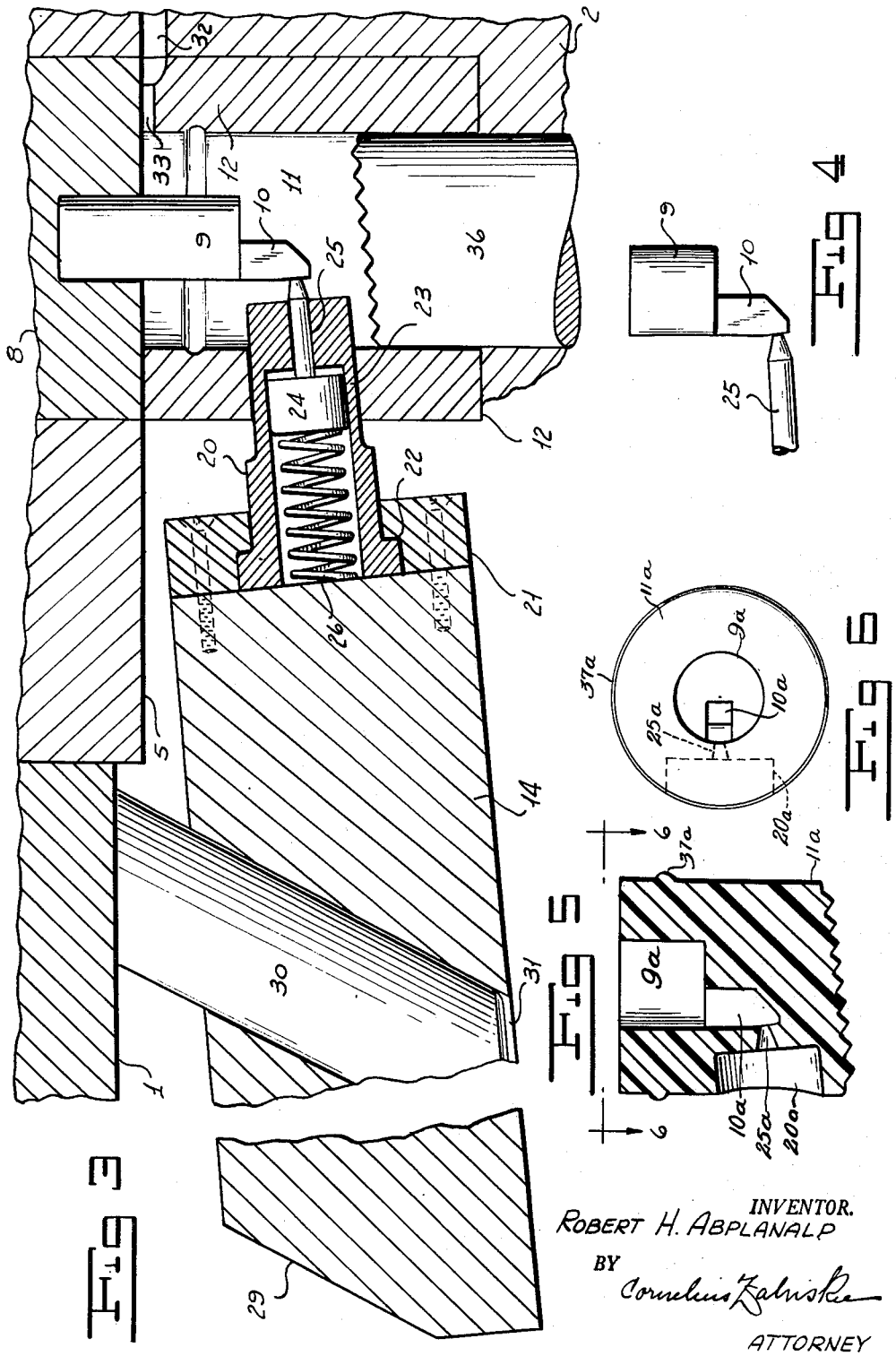

United States Patent Office 2,783,502
Patented Mar. 5, 1957

2,783,502

APPARATUS FOR MOLDING PLASTICS

Robert H. Abplanalp, Bronx, N. Y., assignor, by direct and mesne assignments, of one-half to John J. Baessler, Yonkers, N. Y.

Application October 12, 1953, Serial No. 385,524

4 Claims. (Cl. 18—42)

This invention relates to the molding of plastics and, while adapted for general application, is primarily intended for the molding of the push buttons used for operating the valves of aerosol dispensers.

Aerosols are commonly packaged in pressure containers with a dip tube leading to a dispensing valve, the stem of which is adapted to be operated by a push button. When the valve is opened, the material passes from the container, through the dip tube to and through the valve to an expansion chamber in the push button and is discharged through a relatively small outlet orifice in the wall of the latter or in a nozzle formed thereon. It is generally desired that aerosol liquids be dispensed in very finely divided condition, generally as a fine spray of conical or other form, depending upon their particular uses. Consequently the shape and size of the orifice is of considerable importance in the operation of an aerosol dispenser.

These facts are well known, but manufacturers of such dispensers have not heretofore found any completely satisfactory way of forming the orifice in a push button of the character described. Unless properly formed, the spray cone is not of uniform shape or character. The liquid may be more finely divided in certain parts thereof than in other parts and may contain relatively large droplets or there may be dripping at the orifice, due to improper shape or size thereof, or the formation of burrs around the passage therethrough. Under prior practice there was no assurance that any two or more push buttons, manufactured under identical conditions and by the same tools, would produce sprays of identical characteristics. They all might operate after a fashion to spray aerosols and yet not one of many function perfectly.

The primary object of this invention is to eliminate the hit or miss practices of the prior art through the production of uniform push buttons with discharge orifices of such size and shape as to give uniform sprays of predetermined characteristics adapted to the particular aerosol liquid to be dispensed.

I am able to accomplish this object by pressure molding push buttons from organic plastics in mold cavities having therein chamber cores shaped to provide, within each casting, an expansion chamber of proper form, size and shape and by simultaneously molding, in each casting, an orifice of predetermined form about an orifice core pin extending through the wall of the mold cavity and abutting the surface of the chamber core therein. By properly sizing, shaping and operating these cores, absolute uniformity of end product is assured and uniform sprays of the desired characteristics are obtained.

A further object of the invention is to materially simplify and cheapen the production of articles of the character described by the use of multiple cavity molds and cooperating cores constructed, arranged and operating in the novel manner hereinafter fully set forth.

Features of the invention, other than those adverted to, will be apparent from the hereinafter detailed description and appended claims, when read in conjunction with the accompanying drawings.

The accompanying drawings illustrate one practical embodiment of the invention, but the construction therein shown is to be understood as illustrative, only, and not as defining the limits of the invention.

Fig. 2 is a transverse section through the upper and lower molds showing said molds separated.

Fig. 3 is an enlarged fragmental transverse section showing the molds closed and with the chamber forming and orifice forming cores in cooperating molding relation within one of the mold cavities.

Fig. 4 is a detailed view showing the casting relation between the chamber forming and orifice forming cores.

Fig. 5 is a vertical central section through the resulting casting, i. e., finished push button.

Fig. 6 is an end view of the casting looking in the direction indicated by the arrows of the line 6—6 in Fig. 5.

Figure 1:
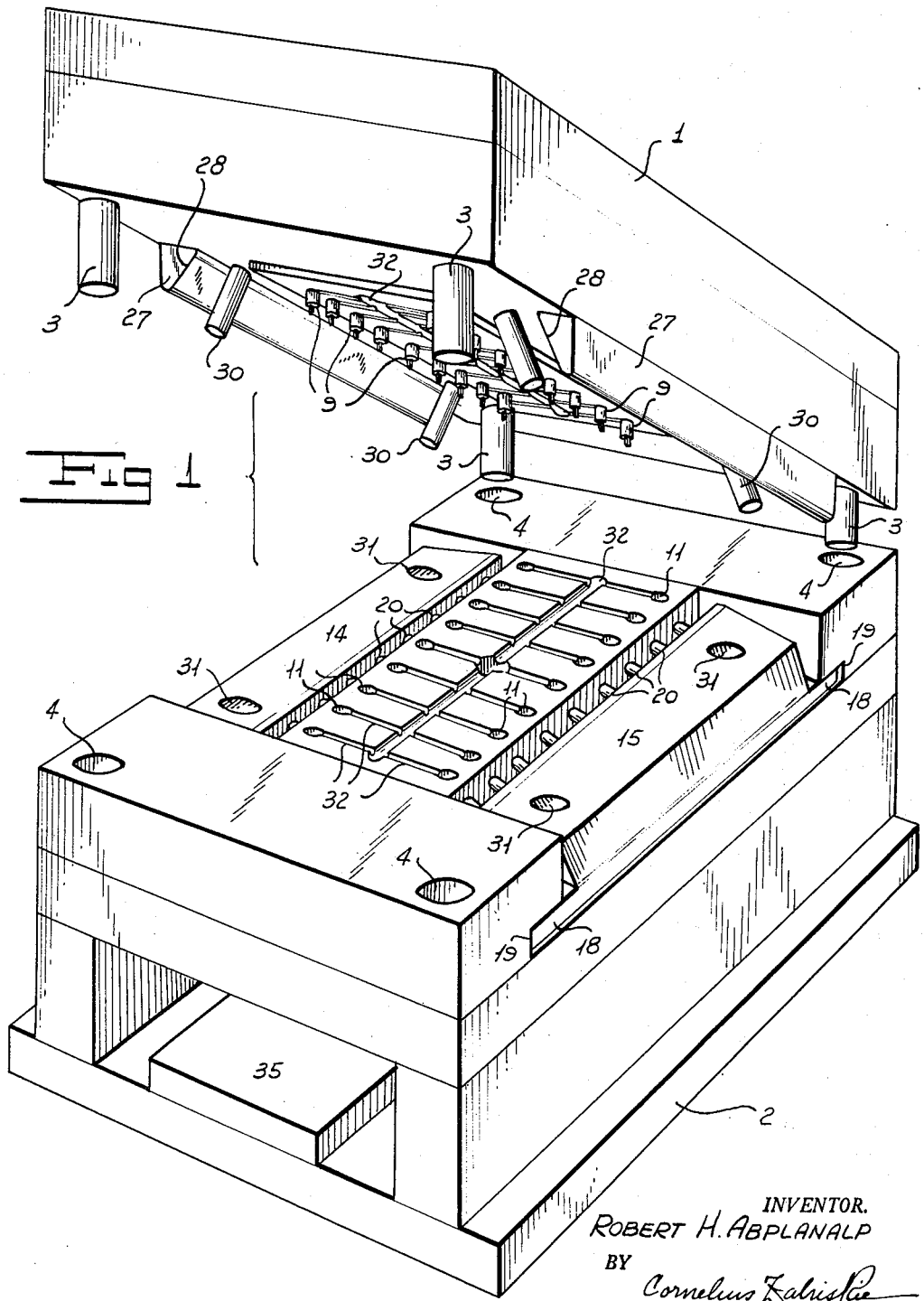
Fig. 1 is a perspective view showing apparatus embodying the present invention comprising generally upper and lower molds, the former of which is illustrated as tilted upwardly to better show those parts which cooperate with the upper portions of the lower mold.

I have shown in the drawings the apparatus of this invention associated, generally speaking, with an upper mold section 1 and a lower mold section 2. In practice, these mold sections may be horizontal or may be set on edge. In either event, said mold sections are attached to the fixed and movable bases of a plastic molding machine of the type wherein thermoplastic material in heated semi-fluid condition is forced, when the mold sections are closed, into die cavities within said mold sections. Such machines are conventional and require no detailed description.

Both the upper and lower mold sections are shown as built up from a plurality of plates for convenience in manufacture. In any event each mold section may be considered as a unit and may be fabricated in any appropriate manner. To insure a proper registration, when in molding relation, the upper section 1 is provided with leader or registering pins 3 adapted to enter holes 4 in the lower mold section.

The under side of the upper mold section is recessed to receive a core block 5 (Fig. 2) which has a close vertical sliding fit within the recess. This core block extends for a substantial distance longitudinally of the mold section 1 and at spaced apart distances longitudinally thereof are interposed compression springs 6 which normally impel the core block in a downward direction. The core block is, however, restrained against disengagement from the mold section by means of limiting or stripper bolts 7.

Spaced laterally apart and received in parallel recesses extending longitudinally of the block 5 are a pair of core bars 8. These have a close fit within their recesses and which fit may be a forced fit or the core bars may be held to the core block by means of screws or bolts, if desired. In each core block is fitted a core pin 9, these core pins being arranged medially of the width of the bar and equally spaced apart longitudinally thereof, so that there may be said to be two parallel rows of core pins mounted on the under side of the core block. Each core pin 9 is provided at its lower end with a core projection 10 of a predetermined shape designed to form an expansion chamber of the desired size, shape and dimension in the several casts to be molded in this apparatus.

The lower mold member is provided with a number of die cavities 11 corresponding in placement to the core pins of the upper die section. Such being the case, these cavities are arranged in two parallel lines spaced apart a distance corresponding to the core pins 9 and correspondingly located in spaced relation to the lateral edges of the lower die section. Each cavity may be conveniently formed within a molding sleeve 12, all of which sleeves are rigidly supported in the lower mold section. Said cavities are moreover of a size and shape to receive the core pins and of a depth appropriate to the push buttons adapted to be molded therein.

Arranged between the molding sleeves 12 and the lateral edges of the lower mold section are a pair of sliding bars 14 and 15. These bars rest upon inclined surfaces 16 and 17, respectively, formed on the upper surface of the lower mold section, the inclination corresponding to that desired in the outlet orifice of the push button. Said sliding bars 14 and 15 are held to these inclined surfaces and mounted for sliding movement thereon by flanges 18 (Fig. 1) which extend beyond their opposite ends and operate within slots or guides 19 formed in the lower mold section and extending transversely thereof.

Mounted on the inner edges of each of the sliding bars 14 and 15 are a series of orifice core pin holders 20, shown in detail in Fig. 3. These holders are secured to the respective sliding bars 14 and 15 by means of plates 21 which engage with flanges 22 on the holders and are bolted to the inner edges of the sliding bars, so that said holders are fixedly secured to the sliding bars. There are as many holders as there are mold cavities and they are so spaced apart and positioned longitudinally of the sliding bars that they are adapted, as the bars are slid transversely of the mold, to be projected through openings 23 in the sides of the molding sleeves 12, as shown best in Fig. 3, and to be retracted therefrom when the bars 14 and 15 are slid apart. In practice, the openings 23 in the sides of the sleeves are preferably cylindrical and those portions of the holder which extend therethrough are similarly formed to have a nice sliding fit therewith.

In each holder is positioned a plunger 24 axially carrying an orifice forming core pin 25 which extends with a nice sliding fit through an opening in the forward closed end of each holder. In back of each such plunger is a compression spring 26 which normally forces the plunger forward, so that, when the core pins 9 are positioned within the mold cavities 11 and the sliding bars advance, the end of the orifice forming core pin 25 will be spring pressed against the core projection 10 of the core pin 9. Close conformity between the contacting parts of these two cores is important, in order that the resulting cast will not be provided with fins or burrs at the junction between the orifice and the expansion chamber of the push button. Consequently, where the pin is arranged at an angle, as shown in Fig. 3, that portion of the core projection 10, which is engaged by the pin 25, is preferably inclined, as shown best in Fig. 4, so that the abutting faces of the cores will contact throughout and produce a nice smooth edge free from fins or burrs around its point of contact.

The end of the core pin 25 is shown as tapered and circular in cross section, although it may be made of any other shape without departing from this invention and the same is true of the core projection 10 in that portion of the core pin 9 which is adapted to project into the mold cavity 11 during the molding operation. With the arrangement shown, however, the resulting cast button will appear as shown in Figs. 5 and 6. The button, as shown, has been proven highly satisfactory in the dispensing of a wide variety of aerosol liquids.

Both the cores for casing the cavities in the push buttons and the core pins for forming the orifice outlets are brought into cooperative relation with the mold cavities by the act of bringing the upper and lower mold sections into closed cooperative relation. The mere bringing together of these sections will of course enter the core pins 9 and their projections into the mold cavities and simultaneously close the tops of the mold cavities. This closure will be positively assured by virtue of the pressure of the springs 6 back of the core block 5 which will produce a tight joint at the top of each cavity.

The sliding bars 14 and 15 are adapted to be slid into advanced position wherein the holders 20 and the nozzle forming core pins 25 will project into the mold cavities 11 by camming ribs 27 extending along the lateral edges of the upper mold 1 and having camming surfaces 28 adapted to coact with camming surfaces 29 extending along the outer edges of the sliding bars 14 and 15. As the mold sections come together, the camming surfaces 28 and 29 cooperate to slide the sliding bars into the advanced position stated. At the same time horns 30, depending from the top mold section 1, are caused to enter registering holes 31 in the sliding bars 14 and 15, which horns 30 and holes 31 are inclined at the same angle as the corresponding camming surfaces 28 and 29.

The camming ribs 27 of the upper mold section are primarily utilized to advance the sliding bars 14 and 15 and when the die sections are subsequently separated, the horns 30 will serve to retract said sliding bars. Thus the mere act of moving the die sections into and out of cooperative relation with one another will automatically bring about the proper positioning of the cores within the several mold cavities and their subsequent withdrawal from said mold cavities.

When the die sections are in mating relation, i. e., in a position to close the mold cavities and position the cores therein, the plastic material in semi-liquid condition is adapted to be introduced into the cavities 11 through channels 32 and through sprue openings 33 leading to each cavity. The plastic material may be fed to the channels 32 through an appropriate passage of either mold section.

After the castings have been produced in the several mold cavities, the lower die section is withdrawn from the upper die section and, as the lower die section approaches the terminus of its retractive movement, one or more fixed pins 34 engage with an ejector plate 35 (Fig. 2) within the lower mold section. This ejector plate carries a number of ejector pins 36 which extend into the several molding sleeves 12 and form the bottoms of the mold cavities. As these pins are forced upwardly, when the lower die section is backed off, said pins serve to eject the castings from all of the cavities simultaneously. These several castings are ejected from the lower mold section attached to the plastic material contained in the several channels 32 and the sprue openings 33, but these sprue openings are made of reduced cross section, so that the several castings may be individually broken off from the plastic casting in a simple and expeditious manner.

It may be noted that in Fig. 2 the mold cavities are shown as provided with shallow peripheral channels 37. These will not interfere with the ejection of the castings from the cavities for, when the casts are removed, they are sufficiently soft to permit them to be readily ejected.

The apparatus which I have described provides a simple, efficient and highly satisfactory means of casting large numbers of push buttons in gang molds. Experience has shown that the push buttons come from the mold in perfect condition, free from burrs and fins and ready to be attached to the valve stems of aerosol dispensers with which they are adapted for ultimate use.

The apparatus of this invention, as shown in the drawings, produces the novel push button 11a of this invention, shown in Figs. 5 and 6. This button is substantially cylindrical in form and it is provided near one end with a circumferential bead 37a. One end surface of the button is normal to the axis of the button and in this surface is formed a centrally located socket 9a adapted to receive and tightly fit the outlet end of a tubular valve stem. In the base of the socket 9a is formed an off center expansion chamber 10a of rectangular cross section and in one side of this expansion chamber is a discharge orifice 25a. This orifice flares in the direction of its outer end where it terminates coaxially of a cylindrical outlet mouth 20a formed in the outer cylindrical surface of the button. The common axis of both the orifice and the cylindrical outlet mouth is inclined to the axis of the button as shown. The closed end of the button is inclined in the direction of the outlet mouth and it has a milled or serrated surface as shown.

The foregoing detailed description sets forth the invention in its preferred practical form, but the invention is to be understood as fully commensurate with the appended claims.

Having thus fully described the invention, what I claim as new and desire to secure by Letters Patent is:

1. An apparatus for molding plastic push buttons for aerosol dispensers, comprising: first and second mold sections movable into and out of mating facial relation, the first mold section having a line of mold cavities side by side and extending inwardly into the mold section from the face thereof, channels for feeding semi-liquid plastic to all of said cavities, a bar mounted for edgewise sliding movement toward and away from said cavities, a plurality of orifice cores at the forward edge of the bar alined with orifice core openings in the adjacent sides of the mold sections, means for supporting the orifice cores for individual longitudinal movement on the sliding bar, the second mold section having chamber forming dies projecting from its face and corresponding in number and placement with the cavities of the first mold section and adapted to enter said cavities when the sections are brought into mating relation, camming means on the second mold section and on the sliding bar of the first mold section to move said bar from retracted to advanced positions when the sections are brought into mating relation to place the orifice forming cores in their respective cavities with the inner ends of said orifice cores abutting the adjacent sides of the chamber forming cores, each of said orifice forming cores being individually spring pressed to insure their firm contact with the chamber forming cores and the chamber forming cores being spring pressed to insure that they pass the core openings in the sides of the cavities before they are engaged by the orifice forming cores.

2. Apparatus according to claim 1, wherein the bar is mounted for sliding movement along an inclined plane to move each orifice forming core in a direction inclined to the axis of its corresponding cavity.

3. Apparatus according to claim 1, wherein ejector plungers extend into the bottom of each mold cavity with means for simultaneously operating the plungers to eject the finished castings while the mold cavities are separated.

4. An apparatus for molding plastic push buttons for aerosol dispensers, comprising: first and second mold sections relatively movable into and out of mating facial relation, the first mold section having two substantially parallel lines of mold cavities with the cavities of each line spaced from one another and extending inwardly into the mold section from the face thereof, channels for feeding semi-liquid plastic to all of said cavities, a bar mounted for edgewise sliding movement toward and away from each line of mold cavities, a plurality of parallel orifice cores at the forward edge of each bar alined with orifice core openings in the adjacent sides of the corresponding line of mold cavities, means for supporting the orifice cores for individual longitudinal movement on the respective bars, the second mold section having chamber-forming cores projecting from its face and corresponding in number and placement with the cavities of the first mold section and adapted to enter said cavities when the sections are brought into mating relation, camming means mounted on the second mold section and on the sliding bars of the first mold section to move said bars from retracted to advanced positions when the sections are brought into mating relation to place the orifice forming cores in their respective cavities with the inner ends of said orifice cores abutting the sides of the chamber forming cores, each of said orifice forming cores being individually spring pressed to insure their firm contact with the chamber forming cores and the chamber forming cores being spring pressed to insure that they pass the core openings in the sides of the cavities before they are engaged by the orifice forming cores.

References Cited in the file of this patent

UNITED STATES PATENTS

| | | |
|---|---|---|
| 2,161,521 | McWane | June 6, 1939 |
| 2,204,407 | Flammang et al. | June 11, 1940 |
| 2,339,792 | Milano | Jan. 25, 1944 |
| 2,477,368 | Gits | July 26, 1949 |
| 2,519,171 | Bolten | Aug. 15, 1950 |
| 2,571,766 | Saulino | Oct. 16, 1951 |
| 2,750,081 | Campbell | June 12, 1956 |
| 2,761,594 | Stroh | Sept. 4, 1956 |